United States Patent
Broccoli-Hickey et al.

(10) Patent No.: US 12,446,655 B2
(45) Date of Patent: Oct. 21, 2025

(54) SOLES HAVING A CO-MOLDED LATTICE STRUCTURE AND SOLID REGION, FOOTWEAR HAVING THE SOLE, AND METHODS OF MANUFACTURING THE SAME

(71) Applicant: adidas AG, Herzogenaurach (DE)

(72) Inventors: Joseph Thomas Broccoli-Hickey, Portland, OR (US); Christian Manuel Arias Delgado, Portland, OR (US); Zachary C. Coonrod, Portland, OR (US); Stephen P. Dobson, Portland, OR (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/400,864

(22) Filed: Dec. 29, 2023

(65) Prior Publication Data
US 2025/0212991 A1    Jul. 3, 2025

(51) Int. Cl.
  *A43B 13/14*    (2006.01)
  *A43B 13/12*    (2006.01)
  *B33Y 80/00*    (2015.01)

(52) U.S. Cl.
  CPC .............. *A43B 13/14* (2013.01); *A43B 13/12* (2013.01); *B33Y 80/00* (2014.12)

(58) Field of Classification Search
  CPC .......... A43B 13/14; A43B 13/12; A43B 1/009
  USPC ........................................................ 36/25 R
  See application file for complete search history.

(56) References Cited

U.S. PATENT DOCUMENTS

| | | |
|---|---|---|
| 354,693 A | 12/1886 | Dick |
| 1,111,437 A | 9/1914 | Butterfield |
| 2,205,356 A | 6/1940 | Rose et al. |
| 2,853,809 A | 9/1958 | Carlo |
| 3,253,601 A | 5/1966 | Scholl |
| 3,416,174 A | 12/1968 | Novitske |
| 3,793,750 A | 2/1974 | Bowerman |
| 4,012,855 A | 3/1977 | Gardner |

(Continued)

FOREIGN PATENT DOCUMENTS

| | | |
|---|---|---|
| CN | 101611953 A | 12/2009 |
| CN | 102578760 A | 7/2012 |

(Continued)

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

(Continued)

*Primary Examiner* — Marie D Bays
(74) *Attorney, Agent, or Firm* — Sterne, Kessler, Goldstein &Fox P.L.L.C.

(57) ABSTRACT

A sole for an article of footwear includes a plurality of portions, including at least a first portion and a second portion. The first portion includes a lattice structure having a plurality of unit cells. The plurality of unit cells may include a first subset of unit cells and a second subset of unit cells that is different than the first subset of unit cells. The second portion includes a solid material that at least partially encapsulates one or more of the unit cells of the first subset of unit cells.

16 Claims, 9 Drawing Sheets

(56) References Cited

U.S. PATENT DOCUMENTS

| | | | |
|---|---|---|---|
| 4,271,606 A | 6/1981 | Rudy | |
| 4,297,796 A | 11/1981 | Stirtz et al. | |
| 4,309,831 A | 1/1982 | Pritt | |
| 4,316,335 A * | 2/1982 | Giese | A43B 7/1445 36/129 |
| 4,378,643 A | 4/1983 | Johnson | |
| 4,439,936 A | 4/1984 | Clarke et al. | |
| 4,607,440 A | 8/1986 | Roberts et al. | |
| 4,638,577 A | 1/1987 | Riggs | |
| 4,774,774 A | 10/1988 | Allen, Jr. | |
| 5,224,279 A | 7/1993 | Agnew | |
| 5,236,637 A | 8/1993 | Hull | |
| 5,337,492 A | 8/1994 | Anderie et al. | |
| 5,367,791 A | 11/1994 | Gross et al. | |
| 5,391,072 A | 2/1995 | Lawton et al. | |
| 5,423,135 A | 6/1995 | Poole et al. | |
| 5,529,473 A | 6/1996 | Lawton et al. | |
| 5,713,140 A | 2/1998 | Baggenstoss | |
| 5,799,417 A | 9/1998 | Burke et al. | |
| 5,862,614 A | 1/1999 | Koh | |
| 5,930,916 A | 8/1999 | Connor | |
| 5,983,529 A | 11/1999 | Serna | |
| 5,985,383 A | 11/1999 | Allen et al. | |
| 6,014,821 A | 1/2000 | Yaw | |
| 6,021,588 A | 2/2000 | Alviso | |
| 6,065,229 A * | 5/2000 | Wahrheit | A43B 13/12 36/31 |
| 6,076,283 A | 6/2000 | Boie | |
| 6,231,946 B1 * | 5/2001 | Brown, Jr. | A43B 13/026 428/140 |
| 6,259,962 B1 | 7/2001 | Gothait | |
| 6,367,172 B2 | 4/2002 | Hernandez | |
| 6,665,958 B2 | 12/2003 | Goodwin | |
| 6,763,611 B1 * | 7/2004 | Fusco | A43B 13/181 36/27 |
| 7,383,647 B2 | 6/2008 | Chan et al. | |
| 7,438,846 B2 | 10/2008 | John | |
| 7,676,955 B2 | 3/2010 | Dojan et al. | |
| 7,704,430 B2 | 4/2010 | Johnson et al. | |
| 7,892,474 B2 | 2/2011 | Shkolnik et al. | |
| 8,110,135 B2 | 2/2012 | El-Siblani | |
| 8,191,284 B2 | 6/2012 | Cho | |
| 8,522,454 B2 | 9/2013 | Schindler et al. | |
| 8,739,639 B2 | 6/2014 | Owings et al. | |
| 8,776,396 B2 | 7/2014 | Huynh | |
| 8,914,998 B2 | 12/2014 | Gheorghian et al. | |
| 8,978,272 B2 | 3/2015 | Hurd et al. | |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,320,316 B2 | 4/2016 | Guyan et al. | |
| 9,453,142 B2 | 9/2016 | Rolland et al. | |
| 9,480,298 B2 | 11/2016 | Barnes et al. | |
| D789,060 S | 6/2017 | Guyan et al. | |
| 9,756,894 B2 | 9/2017 | McDowell et al. | |
| D809,752 S | 2/2018 | Campbell | |
| 9,930,929 B2 | 4/2018 | Cooper et al. | |
| 10,010,133 B2 | 7/2018 | Guyan | |
| 10,010,134 B2 | 7/2018 | Guyan | |
| 10,016,013 B2 | 7/2018 | Kormann et al. | |
| 10,034,516 B2 | 7/2018 | Gheorghian et al. | |
| 10,039,343 B2 | 8/2018 | Guyan | |
| D829,425 S | 10/2018 | Albrecht et al. | |
| D831,315 S | 10/2018 | Mahoney | |
| 10,104,934 B2 | 10/2018 | Guyan | |
| 10,143,266 B2 * | 12/2018 | Spanks | A43B 13/181 |
| D841,300 S | 2/2019 | Albrecht et al. | |
| D841,301 S | 2/2019 | Albrecht et al. | |
| 10,231,511 B2 | 3/2019 | Guyan et al. | |
| 10,259,171 B2 | 4/2019 | Robeson et al. | |
| D847,481 S | 5/2019 | Albrecht et al. | |
| D857,362 S | 8/2019 | Thompson | |
| D859,801 S | 9/2019 | Jenkins et al. | |
| D862,051 S | 10/2019 | Goussev et al. | |
| D862,866 S | 10/2019 | Albrecht et al. | |
| 10,426,226 B2 | 10/2019 | Guyan et al. | |
| 10,434,706 B2 | 10/2019 | Robeson et al. | |
| D873,546 S | 1/2020 | Henrichot | |
| D876,056 S | 2/2020 | Henrichot | |
| D878,016 S | 3/2020 | Henrichot | |
| D879,428 S | 3/2020 | Braun et al. | |
| D879,434 S | 3/2020 | Fick et al. | |
| 10,575,588 B2 | 3/2020 | Perrault et al. | |
| D880,120 S | 4/2020 | Fick et al. | |
| D880,122 S | 4/2020 | Fick et al. | |
| D880,131 S | 4/2020 | Fick et al. | |
| D882,227 S | 4/2020 | Braun et al. | |
| 10,639,861 B2 | 5/2020 | Minh et al. | |
| D890,485 S | 7/2020 | Perrault et al. | |
| D907,904 S | 1/2021 | Perrault et al. | |
| 11,076,656 B2 | 8/2021 | Kormann et al. | |
| 11,399,593 B2 * | 8/2022 | Cross | A43B 13/188 |
| 11,589,647 B2 | 2/2023 | Hettinga et al. | |
| D980,595 S | 3/2023 | Salari-Sharif et al. | |
| 12,161,185 B2 | 12/2024 | Hettinga et al. | |
| 2002/0078598 A1 | 6/2002 | Bell | |
| 2004/0087230 A1 | 5/2004 | Wildeman | |
| 2006/0201028 A1 | 9/2006 | Chan et al. | |
| 2006/0254087 A1 | 11/2006 | Fechter | |
| 2007/0011914 A1 | 1/2007 | Keen et al. | |
| 2007/0043582 A1 | 2/2007 | Peveto et al. | |
| 2008/0289218 A1 | 11/2008 | Nakano | |
| 2009/0013556 A1 | 1/2009 | Nishiwaki et al. | |
| 2009/0126225 A1 | 5/2009 | Jarvis | |
| 2009/0139112 A1 | 6/2009 | Garneau | |
| 2009/0183392 A1 | 7/2009 | Shane | |
| 2009/0211114 A1 | 8/2009 | Ivester et al. | |
| 2009/0293309 A1 | 12/2009 | Keating et al. | |
| 2010/0122471 A1 | 5/2010 | Edington et al. | |
| 2010/0170106 A1 | 7/2010 | Brewer et al. | |
| 2010/0199520 A1 | 8/2010 | Dua et al. | |
| 2010/0251565 A1 | 10/2010 | Litchfield et al. | |
| 2010/0281714 A1 | 11/2010 | Carboy et al. | |
| 2011/0099855 A1 | 5/2011 | Cho | |
| 2012/0117825 A9 | 5/2012 | Jarvis | |
| 2012/0167416 A1 | 7/2012 | Christensen et al. | |
| 2012/0178259 A1 | 7/2012 | Miyazaki et al. | |
| 2012/0180335 A1 | 7/2012 | Mahoney | |
| 2012/0186107 A1 | 7/2012 | Crary et al. | |
| 2013/0118036 A1 | 5/2013 | Gibson | |
| 2013/0145653 A1 | 6/2013 | Bradford | |
| 2013/0171019 A1 | 7/2013 | Gessler et al. | |
| 2013/0273347 A1 * | 10/2013 | Jacobsen | B32B 5/028 428/304.4 |
| 2013/0292862 A1 | 11/2013 | Joyce | |
| 2013/0295212 A1 | 11/2013 | Chen et al. | |
| 2014/0020191 A1 | 1/2014 | Jones et al. | |
| 2014/0026773 A1 | 1/2014 | Miller | |
| 2014/0029030 A1 | 1/2014 | Miller | |
| 2014/0033574 A1 * | 2/2014 | Wan | A43B 1/0072 36/103 |
| 2014/0109441 A1 | 4/2014 | McDowell et al. | |
| 2014/0150170 A1 * | 6/2014 | Kim | A43B 13/187 428/44 |
| 2014/0150297 A1 | 6/2014 | Holmes et al. | |
| 2014/0182170 A1 | 7/2014 | Wawrousek et al. | |
| 2014/0223783 A1 | 8/2014 | Wardlaw et al. | |
| 2014/0226773 A1 | 8/2014 | Toth et al. | |
| 2014/0259779 A1 | 9/2014 | Hashish et al. | |
| 2014/0259787 A1 | 9/2014 | Guyan et al. | |
| 2014/0259788 A1 | 9/2014 | Dojan et al. | |
| 2014/0259789 A1 | 9/2014 | Dojan et al. | |
| 2014/0299009 A1 | 10/2014 | Miller et al. | |
| 2014/0300675 A1 | 10/2014 | Miller et al. | |
| 2014/0300676 A1 | 10/2014 | Miller et al. | |
| 2014/0310991 A1 | 10/2014 | Greene et al. | |
| 2015/0000161 A1 | 1/2015 | Peyton et al. | |
| 2015/0033577 A1 | 2/2015 | Dahl et al. | |
| 2015/0033579 A1 | 2/2015 | Barnes et al. | |
| 2015/0033581 A1 | 2/2015 | Barnes et al. | |
| 2015/0089841 A1 | 4/2015 | Smaldone et al. | |
| 2015/0128448 A1 | 5/2015 | Lockyer | |
| 2015/0181976 A1 | 7/2015 | Cooper et al. | |
| 2015/0223560 A1 | 8/2015 | Wawrousek et al. | |

(56) References Cited

U.S. PATENT DOCUMENTS

| | | |
|---|---|---|
| 2015/0245686 A1 | 9/2015 | Cross |
| 2015/0331402 A1 | 11/2015 | Lin et al. |
| 2015/0351493 A1 | 12/2015 | Ashcroft et al. |
| 2015/0360419 A1 | 12/2015 | Willis et al. |
| 2016/0051009 A1* | 2/2016 | Kormann ............... A43B 1/08 36/103 |
| 2016/0122493 A1* | 5/2016 | Farris ............... A43B 13/187 521/82 |
| 2016/0137839 A1 | 5/2016 | Rolland et al. |
| 2016/0160077 A1 | 6/2016 | Rolland et al. |
| 2016/0180440 A1 | 6/2016 | Dibenedetto et al. |
| 2016/0242502 A1* | 8/2016 | Spanks ............... A43B 13/181 |
| 2016/0288376 A1 | 10/2016 | Sun et al. |
| 2016/0295971 A1 | 10/2016 | Arnese et al. |
| 2016/0324260 A1* | 11/2016 | Guyan ............... A43B 13/04 |
| 2016/0324261 A1* | 11/2016 | Guyan ............... B33Y 80/00 |
| 2016/0325520 A1 | 11/2016 | Berger |
| 2016/0360828 A1* | 12/2016 | Guyan ............... A43B 13/141 |
| 2016/0374428 A1 | 12/2016 | Kormann et al. |
| 2017/0129167 A1 | 5/2017 | Castanon |
| 2017/0129169 A1 | 5/2017 | Batchelder et al. |
| 2017/0150778 A1 | 6/2017 | Youngs et al. |
| 2017/0325544 A1* | 11/2017 | Ngene ............... A43B 13/148 |
| 2018/0014606 A1 | 1/2018 | Mokos |
| 2018/0070736 A1 | 3/2018 | Achten et al. |
| 2018/0103719 A1 | 4/2018 | Chen |
| 2018/0126630 A1 | 5/2018 | Panzer et al. |
| 2018/0168284 A1* | 6/2018 | Robertson ............ B29D 35/122 |
| 2018/0243976 A1 | 8/2018 | Feller |
| 2018/0271211 A1 | 9/2018 | Perrault et al. |
| 2018/0271213 A1 | 9/2018 | Perrault et al. |
| 2018/0290374 A1 | 10/2018 | Willis et al. |
| 2018/0368518 A1 | 12/2018 | Re et al. |
| 2019/0069632 A1 | 3/2019 | Meschter |
| 2019/0098960 A1 | 4/2019 | Weisskopf et al. |
| 2019/0160733 A1 | 5/2019 | Mirkin et al. |
| 2019/0208859 A1 | 7/2019 | Mokos et al. |
| 2019/0223543 A1 | 7/2019 | Tamm et al. |
| 2019/0223551 A1 | 7/2019 | Hoffer et al. |
| 2019/0269200 A1 | 9/2019 | Tseng |
| 2019/0289960 A1 | 9/2019 | Loveder |
| 2020/0093221 A1 | 3/2020 | Caldwell et al. |
| 2020/0156308 A1 | 5/2020 | Ramos et al. |
| 2020/0268098 A1* | 8/2020 | Jeng ............... A43B 13/181 |
| 2020/0329815 A1* | 10/2020 | Schmid ............... B33Y 10/00 |
| 2021/0177104 A1* | 6/2021 | Bellali ............... B29D 35/061 |
| 2021/0195989 A1 | 7/2021 | Iwasa et al. |
| 2021/0195995 A1 | 7/2021 | Sakamoto et al. |
| 2021/0321716 A1 | 10/2021 | Kormann et al. |
| 2022/0104579 A1 | 4/2022 | Corcoran-Tadd et al. |
| 2022/0110406 A1 | 4/2022 | Salari-Sharif et al. |
| 2022/0110407 A1* | 4/2022 | Hettinga ............ A43B 3/0036 |
| 2022/0110408 A1* | 4/2022 | Coonrod ............ A43B 13/16 |
| 2022/0117359 A1* | 4/2022 | Cho ............... A43B 1/0009 |
| 2022/0142284 A1 | 5/2022 | Laperriere et al. |
| 2022/0248800 A1* | 8/2022 | Lambertz ............ A43B 7/1464 |
| 2023/0138934 A1* | 5/2023 | Kita ............... A43B 13/181 36/28 |
| 2023/0150239 A1* | 5/2023 | Laurent ............ B29C 51/14 428/161 |
| 2023/0189923 A1 | 6/2023 | Hettinga et al. |
| 2024/0032649 A1 | 2/2024 | Corcoran-Tadd et al. |
| 2024/0122296 A1* | 4/2024 | Matsuhisa ........... B33Y 40/20 |
| 2024/0245165 A1* | 7/2024 | Chen ............... A43D 999/00 |
| 2024/0306765 A1 | 9/2024 | Salari-Sharif et al. |
| 2024/0365922 A1 | 11/2024 | Salari-Sharif et al. |
| 2024/0365923 A1 | 11/2024 | Salari-Sharif et al. |

FOREIGN PATENT DOCUMENTS

| | | |
|---|---|---|
| CN | 203378623 U | 1/2014 |
| CN | 209391169 U | 9/2019 |
| CN | 209403686 U | 9/2019 |
| CN | 110859355 A | 3/2020 |
| EP | 0526892 A2 | 2/1993 |
| EP | 2564719 A1 | 3/2013 |
| EP | 2424398 B1 | 12/2015 |
| EP | 3013171 A1 | 5/2016 |
| EP | 3165109 A1 | 5/2017 |
| EP | 2564714 B1 | 7/2018 |
| EP | 3939462 A2 | 1/2022 |
| ES | 2442448 A1 | 2/2014 |
| ES | 2578730 A1 | 7/2016 |
| JP | 3192899 B2 | 7/2001 |
| JP | 2002238609 A | 8/2002 |
| JP | 2011251190 A | 12/2011 |
| JP | 2014151201 A | 8/2014 |
| JP | 3192899 U | 9/2014 |
| WO | WO-2010126708 A2 | 11/2010 |
| WO | WO-2014008331 A2 | 1/2014 |
| WO | WO-2014009587 A1 | 1/2014 |
| WO | WO-2014015037 A2 | 1/2014 |
| WO | WO-2014100462 A1 | 6/2014 |
| WO | WO-2015164234 A1 | 10/2015 |
| WO | WO-2015169941 A1 | 11/2015 |
| WO | WO-2015169942 A1 | 11/2015 |
| WO | WO-2016066750 A1 | 5/2016 |
| WO | WO-2017210298 A1 | 12/2017 |
| WO | WO-2021169804 A1 | 9/2021 |

OTHER PUBLICATIONS

Green, D., "Adidas is finally bringing 3D-printed shoes into the mainstream," Business Insider.com, Dennis Green, Retrieved from the Internet: (URL:https://www.businessinsider.com/adidas-releases-futurecraft-4d-shoe-2017-4/commerce-on-business-insider), (Year: 2017).

Janusziewicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t-racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., "Adidas is giving Olympic athletes its first-ever 3D-printed shoes," Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., "Here's what 3D printed Future Craft adidas Yeezy boosts would look like, Yeezys geared up for the future," Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science, United States (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring--a-6-month-outsole-warranty/), (Year: 2018), 11 pages.

\* cited by examiner

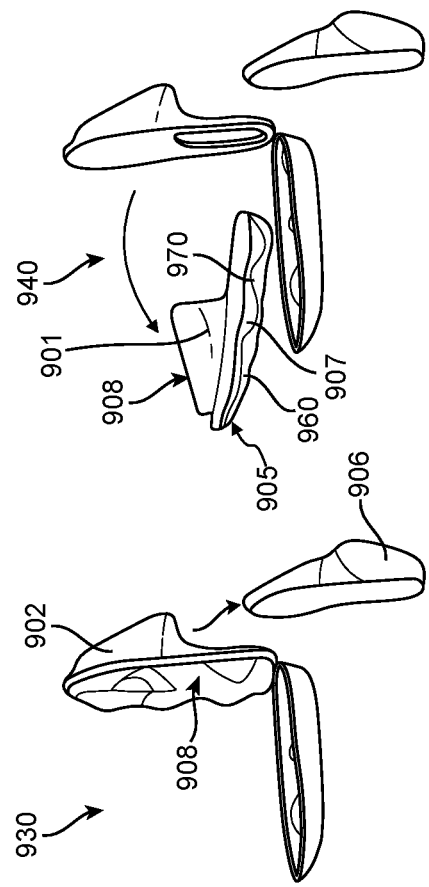
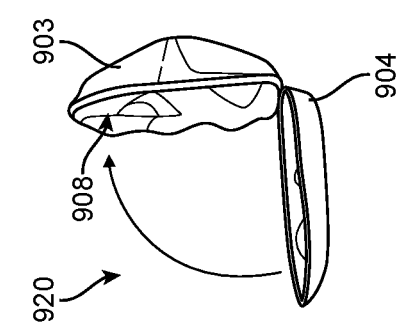
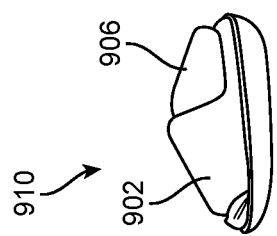
FIG. 9D
FIG. 9C
FIG. 9B
FIG. 9A

SOLES HAVING A CO-MOLDED LATTICE STRUCTURE AND SOLID REGION, FOOTWEAR HAVING THE SOLE, AND METHODS OF MANUFACTURING THE SAME

FIELD OF THE INVENTION

Embodiments described herein are related to a co-molded article. Specifically, embodiments described herein relate to a footwear sole having a co-molded lattice structure and a solid region.

BACKGROUND

Footwear generally includes a sole that provides support and cushioning to a wearer's foot and an upper attached to the sole that encloses the wearer's foot. The sole may be constructed to provide the desired comfort and performance characteristics for the wearer. Soles may be made by molding a foam material. Manufacturing a sole by molding may be inexpensive, but molding methods may provide limited ability to customize the performance characteristics of the sole.

Performance athletes, such as runners and basketball players, among others may desire footwear having specific performance characteristics to optimize their performance. Further, customization of the sole may allow the footwear to be tailored to a particular athlete. Thus, a continuing need exists for soles, and methods of manufacturing the soles, that provide desired properties and performance characteristics.

SUMMARY OF THE INVENTION

Some embodiments described herein relate to a sole for an article of footwear, wherein the sole includes a first portion having a lattice structure with a plurality of unit cells. The plurality of unit cells includes a first subset of unit cells and a second subset of unit cells that is different than the first subset of unit cells. The sole further includes a second portion that includes a solid material, wherein the solid material at least partially encapsulates one or more of the unit cells of the first subset of unit cells.

In any of the various embodiments described herein, the lattice structure may define a channel extending at least partially through the lattice structure. In some embodiments, the solid material may be disposed within the channel defined by the lattice structure. In some embodiments, the first subset of unit cells may bound the channel. In any of the various embodiments described herein, the first portion may include a toe region of the sole, and the second portion may include a heel region of the sole. In any of the various embodiments described herein, the first portion may include an upper portion of the sole, and the second portion may include a lower portion of the sole.

In any of the various embodiments described herein, the solid material may include a foam material.

In any of the various embodiments described herein, the solid material may not contact the second subset of unit cells.

In any of the various embodiments described herein, the first subset of unit cells may have a lattice parameter that is different than a lattice parameter of the second subset of unit cells. In some embodiments, the first subset of unit cells has a unit cell density that is greater than a unit cell density of the second subset of unit cells. In some embodiments, the first subset of unit cells has a cell face opening that is smaller than a cell face opening of the second subset of unit cells. In some embodiments, each of the plurality of unit cells includes a plurality of struts that are interconnected, and the first subset of unit cells has a strut thickness that is greater than a strut thickness of the second subset of unit cells.

Some embodiments described herein relate to a method of forming a sole for an article of footwear, wherein the method includes arranging a lattice structure having a plurality of unit cells in a mold cavity defining a shape of the sole. The plurality of unit cells includes a first subset of unit cells and a second subset of unit cells that is different than the first subset of unit cells. The method further includes flowing a solid material in the mold cavity such that the solid material at least partially encapsulates one or more unit cells of the first subset of unit cells.

In any of the various embodiments described herein, the method of forming a sole may further include controlling the flow of the solid material into the first subset of unit cells by adjusting one or more of the molding temperature or molding pressure.

In any of the various embodiments described herein, the lattice structure may be formed by an additive manufacturing method.

In any of the various embodiments described herein, the first subset of unit cells may have a lattice parameter that is different than a lattice parameter of the second subset of unit cells. In some embodiments, the first subset of unit cells may have a unit cell density that is greater than a unit cell density of the second subset of unit cells. In some embodiments, the first subset of unit cells may have a cell face opening that is smaller than a cell face opening of the second subset of unit cells. In some embodiments, each of the plurality of unit cells may include a plurality of struts that are interconnected, and the first subset of unit cells may have a strut thickness that is greater than a strut thickness of the second subset of unit cells.

In any of the various embodiments described herein, flowing the solid material in the mold cavity includes expanding an expandable foam material within the mold cavity.

Some embodiments described herein relate to a molded article having a first portion that includes a lattice structure having a plurality of unit cells. The plurality of unit cells includes a first subset of unit cells and a second subset of unit cells that is different than the first subset of unit cells. The molded article further includes a second portion that includes a foam material that at least partially encapsulates one or more of the unit cells of the first subset of unit cells.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIGS. 9A-9D show a method for manufacturing an article of footwear according to an embodiment.

DETAILED DESCRIPTION

Figure 1:
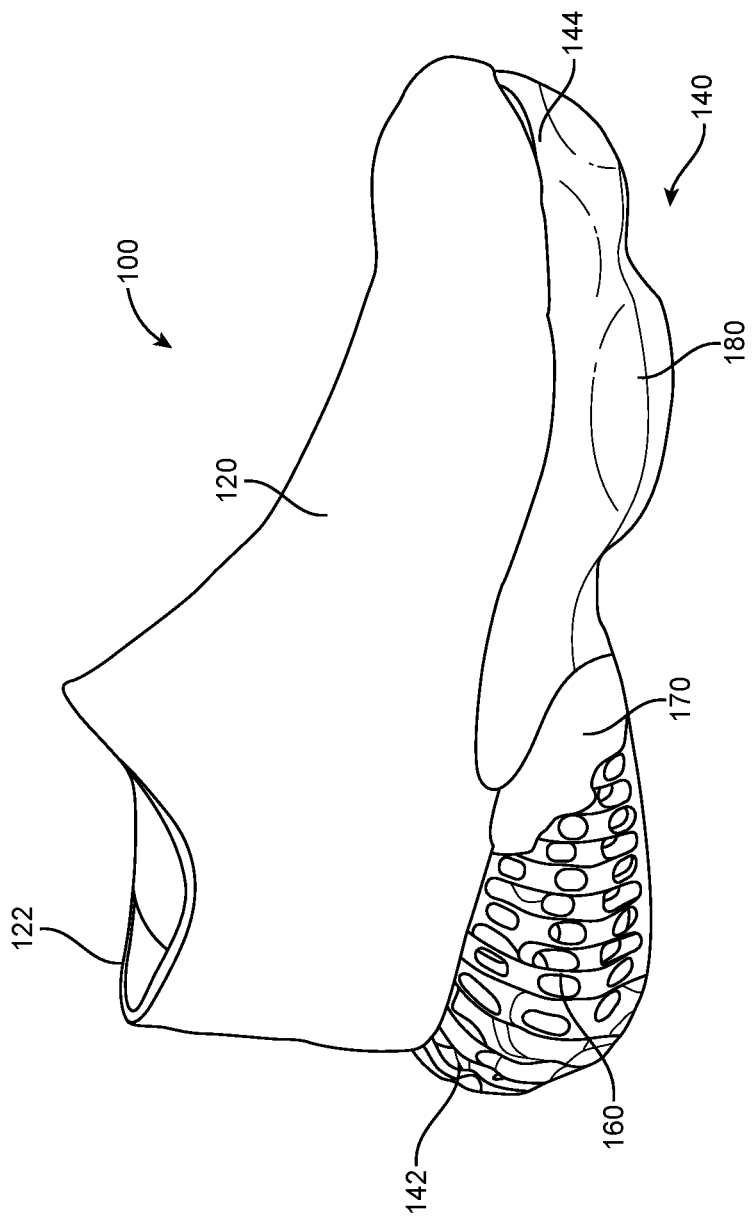
FIG. 1 shows a side perspective view of an article of footwear having a sole having a lattice structure and a solid region according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The indefinite articles "a," "an," and "the" include plural referents unless clearly contradicted or the context clearly dictates otherwise.

The terms "comprising" and "including" are an open-ended transitional phrases. A list of elements following the transitional phrase "comprising" or "including" is a non-exclusive list, such that elements in addition to those specifically recited in the list can also be present.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

Footwear typically included soles formed from a molded material. However, forming a sole by molding may provide limited ability to tailor the properties or performance characteristics of the resulting sole.

To provide improved performance and cushioning characteristics, footwear has been developed that includes a lattice structure in the sole. The use of lattice structures allows for further tailoring of properties of footwear in specific locations by varying the lattice pattern and parameters, such as the shape and dimensions of the unit cells of the lattice structure, among other factors. The footwear can be customized to provide the sole with mechanical properties that vary across or within different regions and/or that vary depending on the direction in which the midsole is loaded (for example, anisotropic properties) to provide performance improvements.

While incorporating a solid molded component and lattice structure may provide improved customization, there are difficulties combining a lattice structure and molded component. The lattice structure may be manufactured in a first process, and the molded component may be molded in a second process. A third process is then required to join the molded component and the lattice structure. The need for separate processes for forming the lattice structure and molded component, and then for subsequently joining the two components can increase the difficulty, time and cost of manufacturing the sole.

Further, in some cases, the lattice structure and solid component are joined by an adhesive. However, the use of adhesives to join the lattice structure and solid components has numerous drawbacks. The use of adhesive may form a relatively weak connection, and as a result the point of connection of the lattice structure to the solid component may be subject to considerable stress during use of the sole, particularly when bending moments are present. The adhesives may also degrade or weaken due to changes in temperature, exposure to excess water, or exposure to soapy solutions. Adhesives also add weight to the sole, which can be particularly undesirable for performance footwear. Adhesives may also contain non-environmentally friendly bonding chemicals. Accordingly, there is a need for improved soles and methods of forming soles incorporating a lattice structure and solid component.

Some embodiments described herein relate to a sole that incorporates a lattice structure and solid region that is formed by co-molding the lattice structure with the solid material. The solid material may at least partially enter the lattice structure during molding. In this way, the resulting molded article may include the solid region mechanically bound to the lattice structure without the use of adhesives. Further, co-molding the lattice structure and solid region can simplify manufacturing by joining the lattice structure to the solid region in the same process in which the solid region is formed.

Further, the inventors found that the degree to which the solid material enters the lattice structure during molding may be controlled by adjusting the parameters of the lattice structure. In this way, the underfoot characteristics of the sole may be adjusted, such as softness, responsiveness, stiffness, and energy return, among others.

As used herein, the term "lattice structure" refers to a three-dimensional structure comprising a plurality of unit cells. The lattice structure includes interconnected structural members defining the plurality of unit cells. The structural members, and thus the unit cells, may be connected at nodes. For example, the interconnected structural members may be struts that are connected at nodes and that define unit cells arranged in a lattice configuration. In some embodiments, the plurality of interconnected unit cells may be arranged in a regular or repeating lattice configuration. Exemplary lattice configurations include, but are not limited to basic cubic lattices, body-centered cubic lattices, face-centered cubic lattices, and modified lattices based on these lattice types. Exemplary lattice configurations include, but are not limited to the lattice structures described in U.S. application Ser. Nos. 17/069,623 and 18/313,135, which are hereby incorporated by reference in their entireties.

Unit cells may have any of various dimensions and geometries. Further, unit cells within lattice structure may be the same or may differ. Thus, lattice structure may include unit cells of different dimensions or geometries. The three-dimensional shape of a unit cell may be defined by a plurality of interconnected struts connected to one another at nodes. In such embodiments, each unit cell may have a base geometry defined by the struts. As used herein, "base geometry" means the base three-dimensional shape, connection, and arrangement of the struts defining a unit cell. The base geometry of a unit cell may be, but is not limited to, a dodecahedron (e.g., rhombic), a tetrahedron, an icosahedron, a cube, a cuboid, a prism, or a parallelepiped. Each node may connect two or more struts. Struts may be arranged to provide a lattice structure with the desired performance characteristics, and a lattice structure may include regions with different densities of struts.

In some embodiments, the interconnected unit cells may comprise a solid representation of a repeating implicit surface of a lattice structure. In such embodiments, the unit cells may comprise a "base surface geometry" defined by the base three-dimensional shape of a body formed by one or more ribbons (walls) of material that define a solid representation of an implicit surface for a full unit cell. In some embodiments, the implicit surface may be a periodic implicit surface such that the base surface geometry of each unit cell contacts the base surface geometry of at least some adjacent unit cells to create a lattice. One example of a suitable periodic surface is a gyroid, but any type of suitable periodic surface can be used.

Herein, a solid representation of an implicit surface refers to a solid object following the shape of an implicit surface. Whereas an actual implicit surface has no thickness, a solid representation of an implicit surface has a thickness on one or both sides of the actual implicit surface in a three dimensional space. The thickness gives the solid representation volume, meaning the solid representation can be built as a physical object from physical material. The added thickness or thicknesses may be uniform, or at least approximately uniform notwithstanding fillets or local deformities, and thin in comparison to the overall size of the represented implicit surface. In some embodiments, the relative density of a unit cell of the solid representation may be from 5% to 30%, from 5% to 40%, from 10% to 25%, or from 15% to 20%. The term "relative density" as used herein refers to an amount of a unit cell occupied by solid material as a percentage of a total volume of the unit cell.

In some embodiments, the implicit surfaces may be created using a combination of random Fourier series functions, in which linear and or nonlinear coefficient as well as linear and nonlinear variables inside sinuous and cosine terms over the x, y and z space are iterated to generate the functions. The resulting unit cells may have different planes of symmetry, such as, in various examples, zero planes of symmetry, one plane of symmetry, or more than one plane of symmetry. The function may be derived in a way that satisfies the periodicity of the unit cell. Criteria for the selection of an applicable implicit surface within the design space domain may include any one or any combination of number of terms in the equation, number of connected components, the edge boundary length, surface area, and volume fraction.

A lattice structure may be formed by additive manufacturing (e.g., three-dimensional (3D) printing). Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process may include a continuous liquid interface production process. For example, the additive manufacturing process may include a continuous liquid interface production process as described in U.S. Pat. No. 9,453,142, issued on Sep. 27, 2016, which is hereby incorporated in its entirety by reference thereto.

In some embodiments, 3-D printing a lattice structure may comprise 3-D printing the lattice in an intermediate green state, shaping the lattice structure in the green state, and curing the green state in its final shape. In some embodiments, 3-D printing a lattice structure may comprise 3-D printing the lattice structure in an intermediate green state, expanding the intermediate green state, shaping the lattice structure in the green state, and curing the green state in its final shape.

Techniques for producing an intermediate green state object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step may be carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Janusziewcz et al., Layerless fabrication with continuous liquid interface production, Proc. Natl. Acad. Sci. USA 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP may be preferred, it will be appreciated that other additive manufacturing techniques, such as jet printing (see, e.g., U.S. Pat.

No. 6,259,962 to Gothait and US Patent App. Ser. No. US 2020/0156308 to Ramos et al.) may also be used.

The lattice structure may be additively manufactured using various materials, including for example include, but are not limited to, a foam, a rubber, ethyl vinyl acetate (EVA), a thermoplastic elastomer, a thermoplastic polyurethane (TPU), an expanded thermoplastic polyurethane (eTPU), an expanded elastomeric polyurethane, a polyether block amide (PEBA), an expanded polyether block amide (ePEBA), a thermoplastic rubber (TPR), and a polyolefin, for example polyethylene (PE), polystyrene (PS) or polypropylene (PP), or a combination of any of these materials, among other materials. Additional materials for use in forming a lattice structure may include polyamides (nylon), carbon and carbon allotropes, such as graphene, carbon nanotubes, and carbon fibers, fiber reinforced polymers, biological materials such as Mycelium, and metals, such as aluminum, steel, or titanium, among others and combinations thereof.

In any of the embodiments described herein, a lattice structure may be selected to provide desired performance characteristics. A lattice structure may be tailored to provide a higher stiffness to weight ratio to provide a lightweight midsole, to control midsole shear stiffness to allow for or to prevent midsole shear, and to control energy return and damping.

As used herein, the terms "solid region" or "solid component" refers to a portion of the sole or other article that is not defined by a lattice structure. Thus, the "solid region" or "solid component" comprises an overall volume or structure defined by a solid, non-latticed structure. A solid region or solid component may be devoid of a lattice structure. A solid region or solid component may be free of openings or voids defining a unit cell unless specifically described otherwise in connection with an embodiment herein. A solid region or solid component may be formed from a solid material, such as a foam material or expanding foam material. Solid material may include one or more of ethylene vinyl acetate (EVA), thermoplastic polyurethane (TPU) or expanded-TPU (e-TPU), a polyether block amide (PEBA), and may include particles of EVA, TPU, or e-TPU, or a combination of any of these materials, among other materials. Additional materials for use in forming the solid region or solid component may include polyamides (nylon), carbon and carbon allotropes, such as graphene, carbon nanotubes, and carbon fibers, fiber reinforced polymers, biological materials such as Mycelium, and metals, such as aluminum, steel, or titanium, among others and combinations thereof. A solid region or solid component may be formed by molding, such as by injection molding, transfer molding, or compression molding, among other molding methods. In embodiments having multiple solid regions or components, each solid region or component may be formed of the same material or may be formed of different materials depending on the desired properties of a sole.

As discussed herein, a "solid region" or "solid component" may be co-formed (for example, co-molded) with a lattice structure in an "interface region." In the interface region, solid material of the solid region or solid component may fully or partially encapsulate unit cells of a lattice structure. The solid material of the solid region or solid component may fully or partially fill unit cells of the lattice structure to fully or partially fill space within the unit cells. The unit cells of the lattice structure may be fully or partially embedded within the solid material of the solid region or solid component in the interface region. In some embodiments, an article may include multiple, separate interface regions.

Within an interface region, one or more rows or columns of unit cells may be fully or partially encapsulated within the solid material of the solid region or solid component. In some embodiments, an interface region may include multiple consecutive rows or columns of unit cells fully or partially encapsulated with the solid material of the solid region or solid component.

In some embodiments, an interface region may include a first subset of unit cells as described herein, a second subset of unit cells as described herein, or both a first subset of unit cells as described herein and a second subset of unit cells as described herein. As described herein, the solid material of the solid region or solid component may fully or partially encapsulate the first subset of unit cells. Additionally, as described herein, the solid material of the solid region or solid component may fully or partially encapsulate a portion of the second subset of unit cells. In some embodiments, an interface region may surround all of a portion of a channel formed in a lattice structure as described herein. In such embodiments, solid material of the solid region or solid component may fully or partially encapsulate unit cells (for example, one or more unit cells rows) bounding the channel and located within the interface region.

Some embodiments described herein relate to a sole for an article of footwear that includes a first portion having a lattice structure and a second portion that includes a solid region. The lattice structure may form all or a portion of one or more of a toe region, a midfoot region, or a heel region of a sole. Similarly, the solid region may form all or a portion of one or more of a toe region, a midfoot region, or a heel region of a sole. Together, the lattice structure and solid region may form all or a portion of the toe region, the midfoot region, and the heel region of a sole.

The lattice structure may include a first subset of cell units and a second subset of cell units. The first subset of cell units may include a first lattice parameter and the second subset of unit cells may include a second lattice parameter that is different than the first lattice parameter. The lattice parameter may include one or more of unit cell density, strut thickness, a wall thickness for implicit surface unit cells, a number of struts forming unit cells, unit cell face opening, or unit cell geometry, among others. The lattice parameters may be selected to control a flow of solid material into lattice structure, such as to allow solid material to enter some portions of lattice structure and not others.

Some embodiments described herein relate to a method for manufacturing a sole for an article of footwear that includes manufacturing a lattice structure. The lattice structure may be formed by an additive manufacturing process. The lattice structure may be inserted into a mold cavity of a mold. In such embodiments, a molding material is inserted into the mold cavity and the molding material may be molded such that the molding material at least partially encapsulates one or more cells of the lattice structure. In some embodiments, the lattice structure and solid region are mechanically bound to one another without the use of adhesives or other fasteners.

An article of footwear 100 according to an embodiment is shown in FIG. 1. Article of footwear 100 may include a sneaker or other athletic shoe, such as a running sneaker, basketball sneaker, football sneaker, cleat, walking shoes, or boots. Article of footwear 100 may include non-athletic footwear, including a shoe, sandal, slide, loafer, or flat, among other articles of footwear.

Article of footwear 100 includes an upper 120 and a sole 140. Upper 120 is configured to cover a portion of a wearer's foot and may securely receive and the position the foot relative to sole 140. Upper 120 may define an opening 122 for receiving a wearer's foot into footwear 100. Upper 120 may include laces or other fastening system for adjusting the fit of upper 120 and securing upper 120 to a wearer's foot. Upper 120 may define eyelets for receiving laces therethrough. Upper 120 may have an elastic or stretchable construction so as to stretch to conform to and secure footwear 100 to a wearer's foot. In some embodiments, upper 120 may have a sock-like construction.

Upper 120 may be formed as one or more components secured together or may be formed as a single piece. In some embodiments, upper 120 may be manufactured separately from sole 140 and secured to sole 140 in a separate process. Upper 120 may be secured to sole 140 by stitching, adhesives, seam tape, or other types of fasteners and fastening methods, and combinations thereof. In some embodiments, upper 120 or a portion thereof may be integrally manufactured with sole 140. In some embodiments, upper 120 may be formed by an additive manufacturing method. In such embodiments, upper 120 or a portion thereof may be molded along with sole 140, as described in further detail herein.

Upper 120 may include a natural material, synthetic material, or combination thereof. Upper 120 may include one or more layers, and may be a single layer or may have a multi-layer construction. Upper 120 may include a knit material, a woven material, or a non-woven material, among others, and combinations thereof. Knit material may be formed by a knitting method, such as by flat knitting, or circular knitting, and may be formed by warp-knitting or weft-knitting. Knit material may be formed from one or more yarns, and each yarn may include one or more filaments or fibers. Yarns may include elastic yarns, shrink yarns, melt yarns, or monofilaments, among other types of yarns. Upper 120 may include a thermoplastic yarn. Thermoplastic yarn may include a core of a non-thermoplastic material surrounded by a shell of a thermoplastic material, or a core of a thermoplastic material surrounded by a shell of a non-thermoplastic material, or yarn may be entirely formed from a thermoplastic material.

Sole 140 may include one or more of an insole, a midsole, and an outsole. Sole 140 may include one or more portions. At least one portion includes a lattice structure 160. In some embodiments, multiple portions of sole 140 may include a lattice structure 160. At least one portion of sole 140 includes a solid region 180. In some embodiments, multiple portions may be solid regions 180. In some embodiments, solid region 180 may be devoid of a lattice structure. Solid region 180 may be formed by molding. Lattice structure 160 and solid region 180 are mechanically bound to one another at an interface region 170, such as by co-molding, as described in further detail herein.

In the embodiment of FIG. 1, footwear 100 is shown as having a sole 140 with a first portion 142 and a second portion 144. First portion 142 includes a lattice structure 160. Second portion 144 includes a solid region 180. However, it is understood that sole 140 may include additional portions that include additional lattice structures, or additional solid regions.

Figure 2:
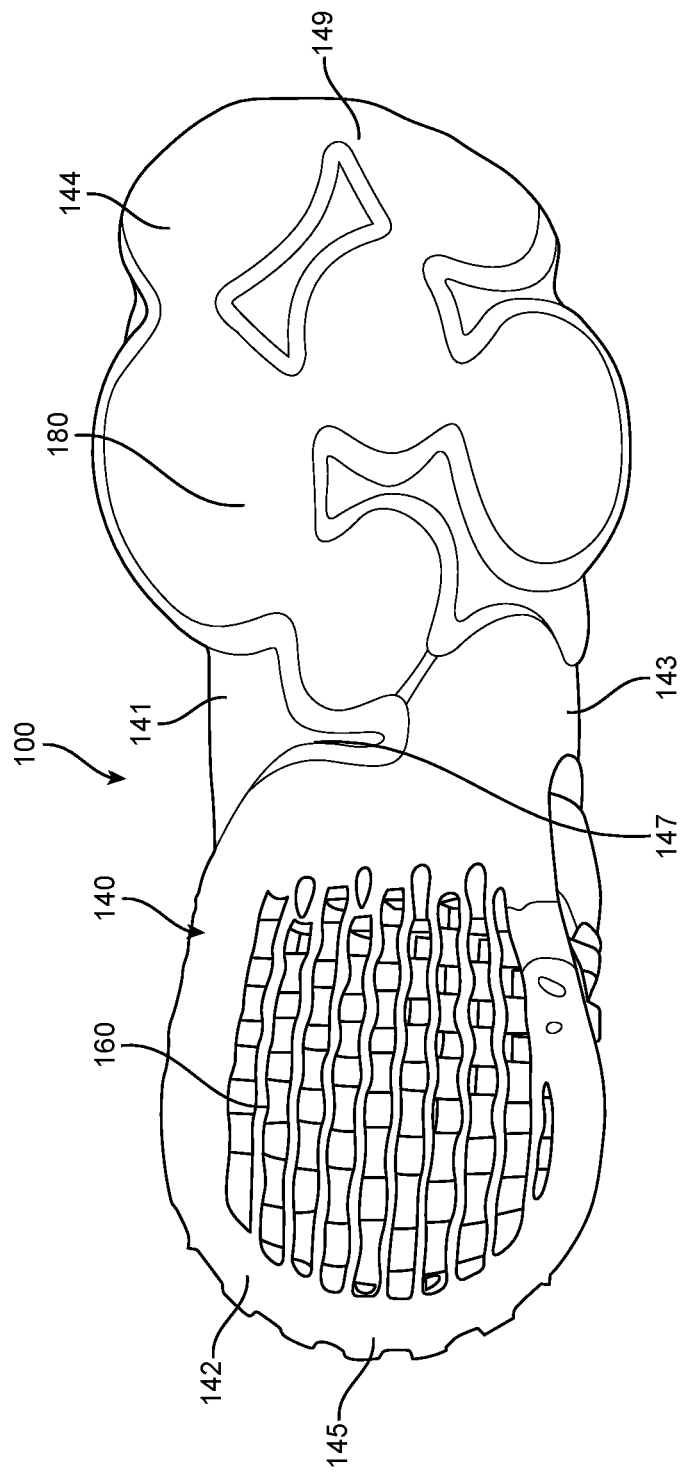
FIG. 2 shows a bottom view of the article of footwear of FIG. 1.

A bottom view of footwear 100 of FIG. 1 is shown in FIG. 2. Sole 140 may include a medial side 141 opposite a lateral side 143. Sole 140 may include a heel region 145, a midfoot region 147, and a toe region 149. Lattice structure 160 may be arranged an any of heel region 145, midfoot region 147, and toe region 149, or a combination thereof, and may be arranged at medial side 141, at lateral side 143, or both, and may extend completely from medial side 141 to lateral side 143 or partially from medial side 141 to lateral side 143 or vice versa. Lattice structure 160 may be arranged at an upper portion of sole 140 toward upper 120 or at a bottom portion of sole 140, and may extend completely or partially from upper portion to bottom portion of sole 140.

Solid region 180 may arranged at any location not occupied by lattice structure 160. Thus, solid region 180 may similarly be arranged at any of heel region 145, midfoot region 147, and toe region 149, or a combination thereof, and may be arranged at medial side 141, at lateral side 143, or both, and may extend completely from medial side 141 to lateral side 143 or partially from medial side 141 to lateral side 143 or vice versa. Solid region 180 may be arranged at an upper portion of sole 140 toward upper 120 or at a bottom portion of sole 140, and may extend completely or partially from upper portion to bottom portion of sole 140. In some embodiments, solid region 180 may form a remainder of sole 140 not formed by lattice structure 160 and interface region 170.

In the embodiment shown in FIG. 2, lattice structure 160 is arranged at a heel region 145. Lattice structure 160 extends toward midfoot region 147 and transitions to a solid region 180 at interface region 170 in midfoot region 147. Lattice structure 160 extends from an upper portion of sole 140 to a bottom portion of sole 140 (see FIG. 1) and from medial side 141 to lateral side 143. Solid region 180 is arranged at midfoot region 147 and toe region 149. Solid region 180 extends from upper portion of sole 140 to bottom portion of sole 140 and from medial side 141 to lateral side 143.

Figure 3:
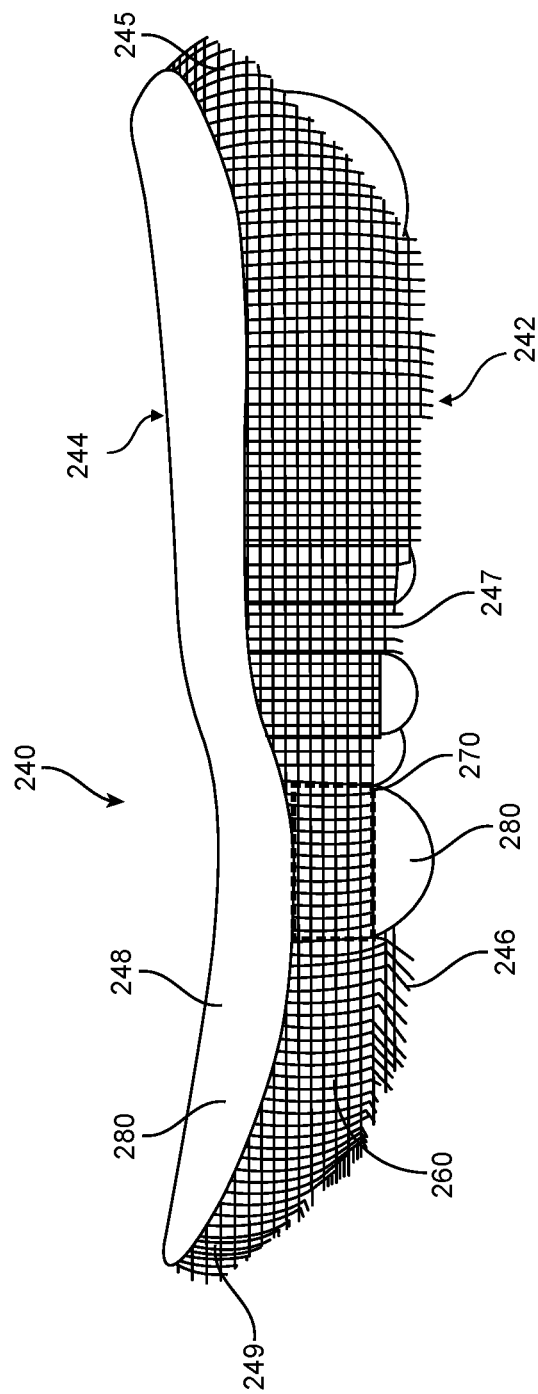
FIG. 3 shows a side perspective view of a sole having a lattice structure and a solid region according to an embodiment.

A sole 240 according to an embodiment is shown in FIG. 3. Sole 240 includes a first portion 242 that includes a lattice structure 260 and a second portion 244 that includes a solid region 280. Lattice structure 260 is arranged on a bottom portion 246 of sole 140 and is arranged at each of toe region 249, midfoot region 247, and heel region 245. Lattice structure 260 extends from medial side to lateral side. Solid region 280 is arranged at upper portion 248 of sole 240 and is arranged at each of toe region 249, midfoot region 247, and heel region 245. Solid region 280 extends from medial side to lateral side.

In some embodiments, solid region 280 may extend into and at least partially fill a portion of lattice structure 260 in one or more interface regions 270. Solid region 280 may at least partially fill one or more unit cells of lattice structure 260 in the interface region(s) 270. Solid region 280 may additionally fill one or more channels formed in lattice structure 260 adjacent to interface region 270 as described in further detail herein. In FIG. 3, solid region 280 fills channels formed in lattice structure 260 such that solid region 280 extends from upper portion 248 through channel of lattice structure 260 toward bottom portion 246 of sole 240. This may help to secure solid region 280 to lattice structure 260, provide sole 240 with desired performance characteristics, or both.

It is understood that FIGS. 1-3 are illustrative of soles 140, 240 having a combination of a lattice structure 160, 260 and solid regions 180, 280, and that other arrangements are possible and are within the scope of the present disclosure. For example, a lattice structure may be arranged at a medial side of sole and a solid region may be arranged at a lateral side of sole in one or more of the heel region, midfoot region, and toe region. Further, sole may include multiple lattice structures, such as a first lattice structure at a heel region, and a second lattice structure at a midfoot region, and may include multiple solid regions, such as a first solid region at a toe region, and a second solid region at midfoot region.

Figure 4:
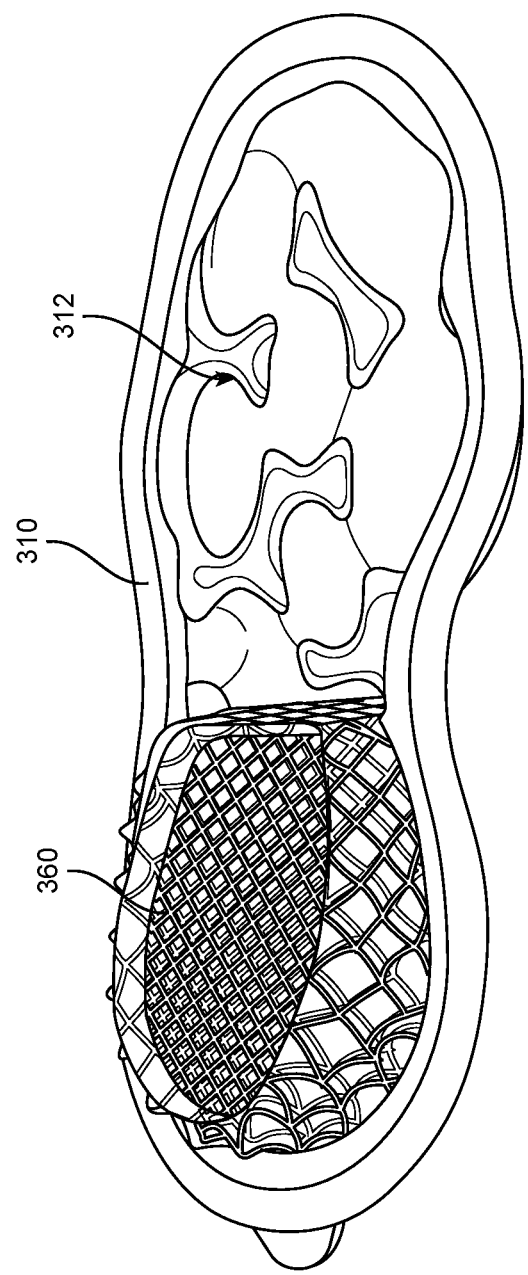
FIG. 4 shows a perspective view of a lattice structure arranged in a mold for forming a co-molded sole according to an embodiment.

A sole having a lattice structure and solid region as described herein may be formed by co-molding. A mold 310 may define a mold cavity 312 having the desired shape of the sole, as shown for example in FIG. 4. A lattice structure, for example lattice structure 160, 260, or 360 may be inserted into mold 310 in a desired location. For example, in FIG. 4, lattice structure 360 is configured to form a heel portion of the sole and is arranged in a heel portion of mold cavity 312. The solid material, such as a foam material, is introduced into the desired location of mold cavity 312 under heat and/or pressure so as to fill, or at least partially fill a remainder of mold cavity 312 not occupied by lattice structure 360.

The solid material may be introduced into a portion of mold cavity 312 not occupied by lattice structure 360. Solid material may flow within mold cavity 312 to take the shape of mold cavity and meets lattice structure 360 at an interface region as described herein. Solid material may enter lattice structure 360 to some degree such that lattice structure 360 and solid material are mechanically bound in the interface region as described in further detail herein. Flowing the solid material in the mold cavity 312 at least partially encapsulates one or more unit cells (for example, one or more unit cells of a first subset of unit cells as described herein) within the solid material. In some embodiments, flowing the solid material in mold cavity 312 may include expanding an expandable material within mold cavity 312. In some embodiments, the expandable material may be an expandable foam material. Once the solid material is allowed to cool or cure, and the resulting co-molded sole may be removed from the mold 310.

A lattice structure as described herein (for example, lattice structure 360) may be made of a material that differs from the solid material. The lattice structure may be made of a material that does not melt or deform under the molding conditions of the solid material, such as at the molding temperature and/or pressure, so that the lattice structure maintains its shape and configuration throughout the molding process.

An exemplary method of molding a sole 512 for an article of footwear is shown in FIGS. 5A-5D. In step 510 shown in FIG. 5A, a lattice structure 502 having a desired shape and configuration is provided. Lattice structure 502 may generally correspond to a shape of sole or a portion thereof. Lattice structure 502 may define one or more openings or channels 504 as described herein. Channels 504 may promote flow of molding material into opening or channel 504 of lattice structure 502. In some embodiments, channels 504 or may receive one or more reinforcing elements prior to molding. Lattice structure 502 may be manufactured by an additive manufacturing process as described herein.

Figure 5D:
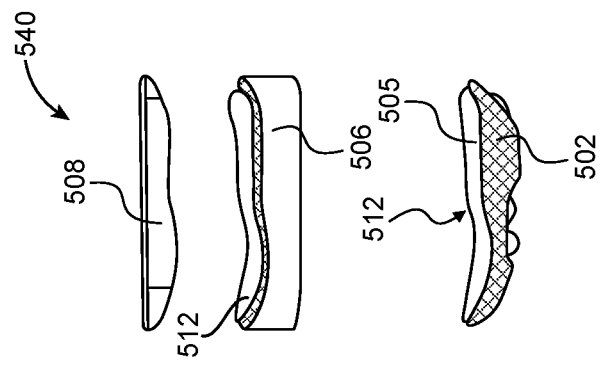
FIGS. 5A-5D show a method for manufacturing a sole having a lattice structure and a solid region according to an embodiment.
Figure 5C:
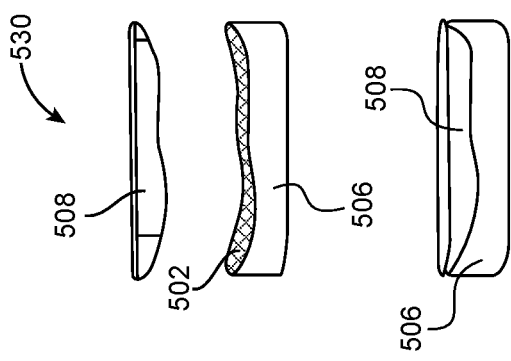
Figure 5B:
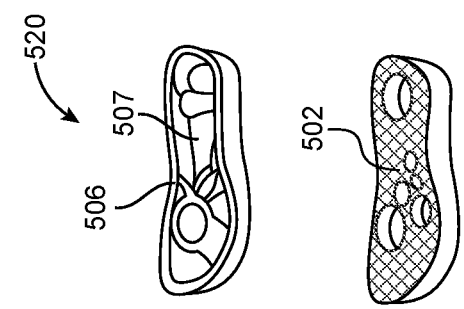
Figure 5A:
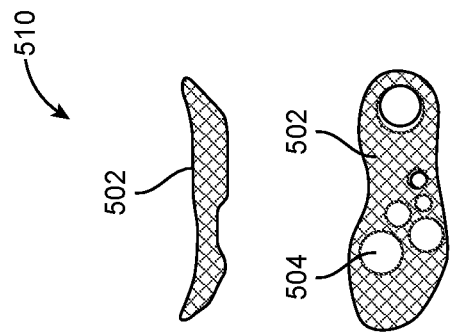

In step 520 shown in FIG. 5B, lattice structure 502 is arranged in a mold 506 that includes a mold cavity 507 that defines the desired shape of the sole 512. In step 530 shown in FIG. 5C, mold 506 may be closed, such as by arranging an upper mold 508 on a lower mold 509. Before and/or after the mold 506 is closed, a solid material may be introduced into mold cavity 507. In some embodiments, mold 506 may include one or more ports into which solid material may be injected or poured. Solid material may fill a portion of mold cavity not occupied by lattice structure 502 and flow into unit cells of the lattice structure 502 in one or more interface regions as described herein. In step 540 shown in FIG. 5D, mold 506 may be opened and the molded sole 512 including the co-molded lattice structure 502 and solid region 505 is removed from the mold.

Figure 6:
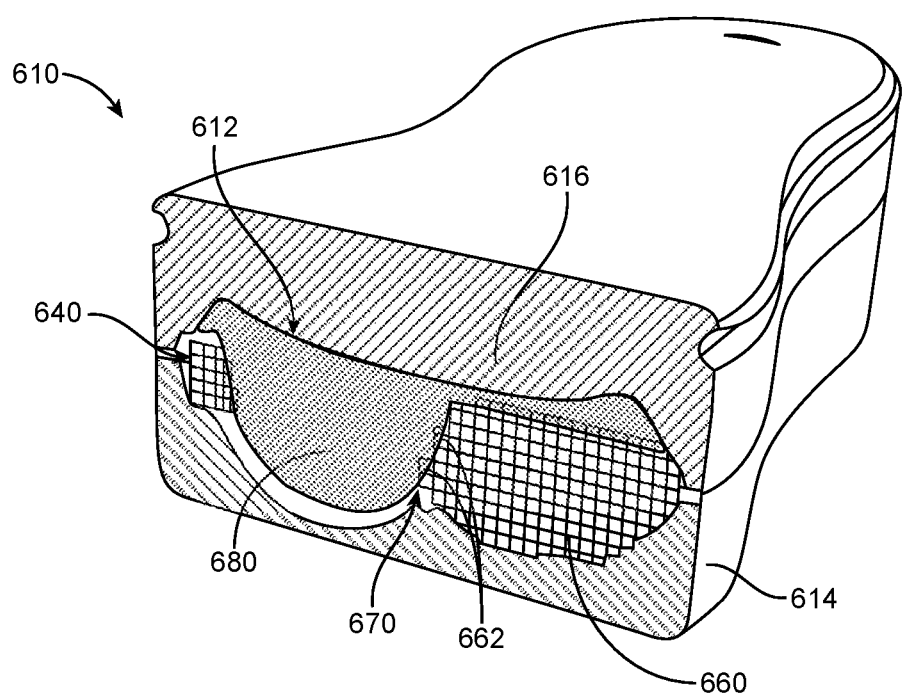
FIG. 6 shows a transverse cross sectional view of a mold for forming a sole having a lattice structure and solid region during a molding process.

A cross section of the lattice structure and solid material in a mold according to some embodiments is shown in FIG. 6. In FIG. 6, mold 610 includes an upper mold 614 and a lower mold 616 forming a mold cavity 612 that defines a shape of the sole 640. Lattice structure 660 is arranged in mold cavity 612 at a desired location to form a portion of the resulting sole 640. Solid material is introduced into the mold cavity 612, such as through one or more ports of mold 610, and fills a portion of mold cavity 612 not occupied by lattice structure 660.

Solid material 680 meets lattice structure 660 at an interface region 670. Solid material 680 at least partially encapsulates one or more unit cells 662 of lattice structure 660 in interface region 670. Lattice structure 660 may be configured to allow solid material 680 to penetrate lattice structure 660 to a desired degree as described herein. For example, solid material 680 may enter and may partially or completely fill one or more unit cells 662 at a face of lattice structure 660. In this way, solid region 680 and lattice structure 660 are mechanically bonded to one another. The mechanical bond may allow sole 640 to be formed without the use of adhesives or other fasteners. The bonding of lattice structure 660 and solid material 680 during molding may also eliminate the need for a subsequent step of joining the solid region formed by molding with a lattice structure, and instead integrally bonds the lattice structure to the solid region during molding of the solid region.

In some embodiments, a lattice structure may be designed to control the flow of solid material into the lattice structure. For example, in embodiments with a solid material that is relatively viscous during molding, the solid material may not readily flow into small or narrow passages of a lattice structure. Accordingly, by varying unit cell geometry and dimensions, the flow of solid material into lattice structure during molding may be precisely controlled. In some embodiments, the flow of solid material into or within a lattice structure may be inhibited by adjusting one or more lattice parameters. In some embodiments, the flow of solid material into or within a lattice structure may be inhibited by (i) increasing a unit cell density of the lattice structure, defined as number of unit cells per unit volume, (ii) increasing the thickness of struts forming the unit cells of the lattice structure, (iii) decreasing a size of a cell face opening of unit cells of the lattice structure, (iv) adjusting the unit cell geometry, (v) increasing the thickness of walls forming the unit cells of the lattice structure, (vi) increasing a number of struts forming the unit cells, or any combination of two or more of (i)-(vi). Similarly, in some embodiments, the flow of solid material into or within a lattice structure may be facilitated by adjusting one or more lattice parameters. In some embodiments, the flow of solid material into or within a lattice structure may be facilitated by (i) decreasing a unit cell density of the lattice structure, defined as number of unit cells per unit volume, (ii) decreasing the thickness of struts forming the unit cells of the lattice structure, (iii) increasing a size of a cell face opening of unit cells of the lattice structure, (iv) adjusting the unit cell geometry, (v) decreasing the thickness of walls forming the unit cells of the lattice structure, (vi) decreasing a number of struts forming the unit cells, or any combination of two or more of (i)-(vi). In some embodiments, increasing or decreasing the thickness of walls forming unit cells may comprise increasing or decreasing the relative density of implicit surface unit cells.

Further, the degree to which solid material enters a lattice structure may also be controlled based on molding parameters, such as the molding temperature, pressure, and molding time, as higher temperatures, higher pressures, and longer molding times may allow molding material to enter lattice structure to a greater extent. Thus, the lattice parameters may be selected along with the molding parameters to tailor the degree to which solid material enters lattice structure during molding.

As used herein, the thickness of a strut may be defined by the "effective diameter" of the strut, but this term should not be interpreted as requiring a strut to have a circular shape. Instead, the struts may have non-circular cross-sectional shapes, and in such embodiments the term effective diameter is intended to refer to the maximum cross-sectional dimension of the cross-sectional shape. For example, the thickness or effective diameter of a strut having a square cross-sectional shape would be the diagonal dimension across the square. As another example, the effective diameter of a strut having an oval cross-sectional shape would be the length of the oval-shape's major axis. For a strut having an effective diameter that varies along the length of the strut (e.g., an hourglass shape), the effective diameter is the smallest effective diameter. The cross-sectional shape of a strut is the shape of the strut in a cross-section perpendicular to the length of the strut between two nodes in a lattice structure.

Figure 7C:
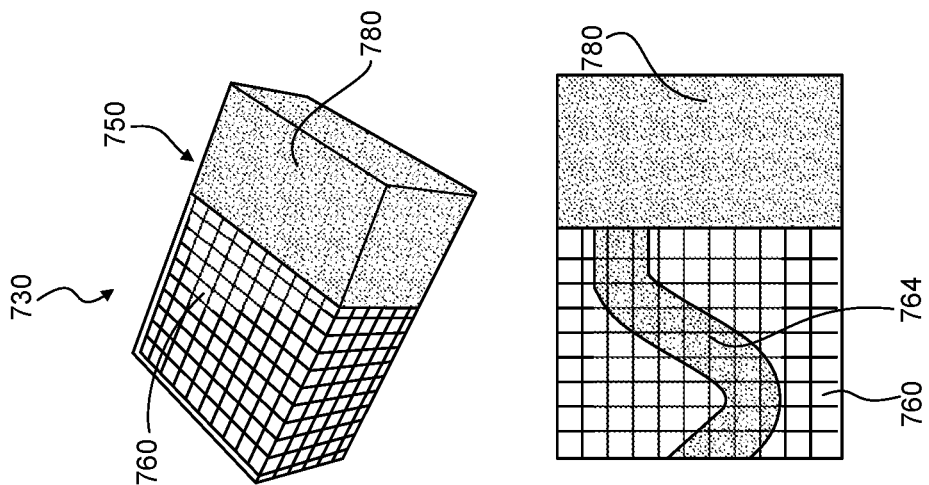
FIGS. 7A-7C show a method of manufacturing a co-molded article having a lattice structure with channels and a solid region.
Figure 7B:
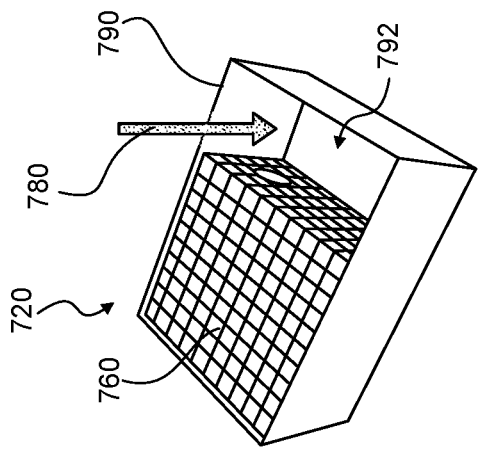
Figure 7A:
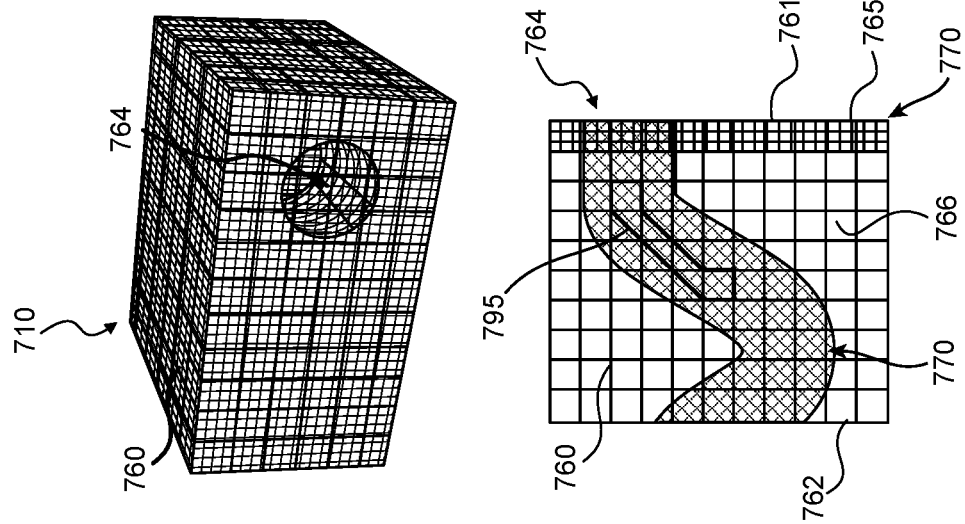

FIG. 7A shows an exemplary lattice structure 760 including a first subset of unit cells 765 and a second subset of unit cells 766. First subset 765 may have one or more lattice parameters that differs from a lattice parameter of second subset 766. As shown in FIG. 7A, first subset 765 has a greater cell density, with more unit cells per unit volume, relative to second subset 766. However, first subset 765 may differ from second subset 766 with respect to a different lattice parameter, and may have a greater strut thickness, a different number of struts per unit cell, a greater wall thickness, a smaller cell face opening, or a different geometry, among others.

In FIG. 7A, first subset 765 is arranged along a first face 761 of lattice structure 760 at which solid material inserted into mold 790 interfaces with lattice structure 760 at an interface region 770. The relatively high unit cell density of first subset 765 may help to limit the flow of solid material into lattice structure 760 during molding. In some embodiments, solid material may enter and partially encapsulate one or more unit cells of the first subset 765, but may not enter or encapsulate unit cells 766 of the second subset 766.

In some embodiments, as shown for example in FIG. 7A, lattice structure 760 may define one or more channels 764. In some embodiments, channels 764 allow for incorporation of reinforcing elements 795, such as one or more rods, bars or plates, into lattice structure 760 and the resulting molded article. In some embodiments, reinforcing element(s) 795 may include a shank or torsion bar. In some embodiments, reinforcing element(s) may be made of a polyamide (nylon), carbon and carbon allotropes, such as graphene, carbon nanotubes, and carbon fibers, fiber reinforced polymers, biological materials such as Mycelium, and metals, such as aluminum, steel, or titanium, among others and combinations thereof. In such embodiments, the one or more reinforcing elements 795 may be fully or partially embedded within the solid material that fills channel 764.

Channels 764 may allow solid material to flow into channel 764 during molding. This may help to further promote bonding and connection of lattice structure 760 to the solid material by allowing solid material to enter unit cells of lattice structure 760 at an interface region 770 located around a channel 764. In some embodiments, this may help to further promote bonding and connection of lattice structure 760 to the solid material by allowing solid material to enter additional unit cells of lattice structure 760 and to enter unit cells within the lattice structure 760 in addition to entering unit cells at first face 761. Channels 764 may further provide the resulting molded article with desired performance characteristics. This allows for further tailoring of performance and properties of sole by allowing portions of lattice structure 760, i.e., corresponding to location of channels 764, to include solid material and/or reinforcing elements therein.

Channel 764 may extend partially or fully through lattice structure 760, and may extend from a first face 761 of lattice structure to a second face 762. Alternatively, channel 764 may extend from a first face 761 into an interior of lattice structure 760 without reaching another face such that the interior end of channel 764 is closed by lattice structure 760. Channel 764 may be linear or may be curved or tortuous. Channel 764 may have a constant effective diameter or may taper or expand along its length. Further, channel 764 may be a single flowpath or may have a branched configuration defining a plurality of flowpaths through lattice structure 760. Channel 764 is shown as having a generally circular cross sectional area. However, channels 764 may have other cross sectional areas, such as a triangular, square, rectangular, or elliptical cross sectional area, among others.

A method of manufacturing a molded article that includes a lattice structure according to some embodiments is shown for example in FIGS. 7A-7C. For example, method shown in FIGS. 7A-7C may be used to manufacture sole 140, sole 240, or sole 512.

A lattice structure 760 having a channel 764 is provided in step 710. In some embodiments, a reinforcing element, such as a rod, bar, or plate may be inserted into channel 764 in step 710. In step 720, lattice structure 760 is then placed in a mold cavity 792 of a mold 790 that defines the shape of the desired article and solid material 780 is introduced into mold cavity. During molding, the solid material 780 fills portion of mold cavity 792 not occupied by lattice structure 760 and also flows into channel 764 of lattice structure 760 within one or more interface regions 770. During molding, the solid material 780 at least partially encapsulates one or more unit cells of lattice structure 760, such as at first face 761 of lattice structure 760. The resulting co-molded article 770 is removed from the mold 790 in step 730. The resulting molded article 750 includes a first portion having lattice structure 760 and a second portion having solid material 780. Solid material 780 may fill channel 764 of lattice structure 760 to provide the resulting molded article 750 with the desired properties and to facilitate connection and securement of lattice structure 760 and solid material 780.

Figure 8A:
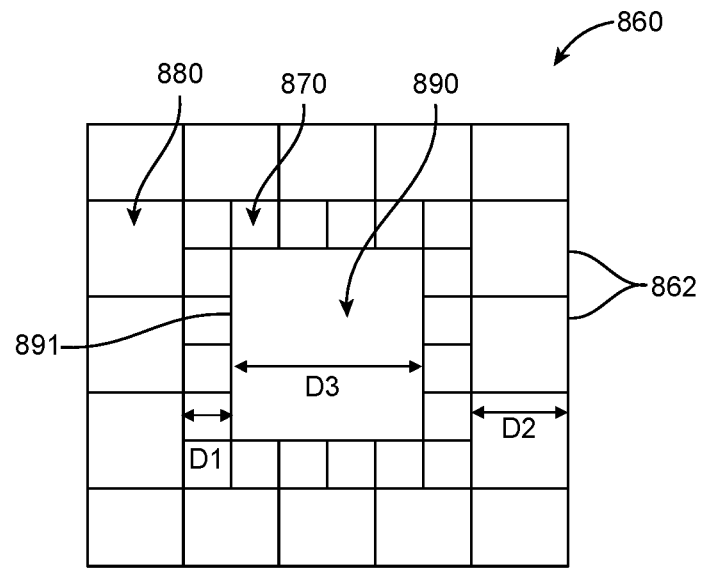
FIGS. 8A-8B show plan views of a portion of a lattice structure having first and second subsets of cell units according to embodiments.

FIG. 8A illustrates an exemplary lattice structure 860 including a plurality of unit cells 862. Lattice structure 860 may include a first subset of unit cells 870 and a second subset of unit cells 880 according to some embodiments. As used herein, a "subset" of unit cells may refer to a plurality of interconnected unit cells that are consecutive or continuous. For example, a subset may refer to unit cells arranged along a row or column of a lattice structure, or in consecutive rows and/or columns. First subset 870 may have a first lattice parameter, and second subset 880 may have a second lattice parameter that differs from the first lattice parameter. As discussed herein, lattice parameters may include a unit cell density, a strut thickness, a number of struts in each unit cell, a size of a cell face opening, unit cell geometry, and a wall thickness of a unit cell, among others.

In some embodiments, the lattice parameter may be a unit cell density, wherein the unit cell density is defined as the number of unit cells per unit volume, e.g., the number of unit cells in 1 cm³. In some embodiments, first subset 870 may have a first unit cell density and second subset 880 may have a second unit cell density that is different than the first unit cell density. In some embodiments, as shown in FIG. 8A, the first unit cell density of first subset 870 is greater than the second unit cell density of second subset 880. In some embodiments, the first unit cell density of first subset 870 may be at least 10% greater than the second unit cell density of second subset 880. In some embodiments, the first unit cell density of first subset 870 is less than the second unit cell density of second subset 880. In some embodiments, the first unit cell density of first subset 870 may be at least 10% less than the second unit cell density of second subset 880.

First subset 870 with relatively high unit cell density may serve to limit the extent to which solid material may flow into first subset 870 during molding. First subset 870 may be configured such that solid material may enter relatively dense first subset 870 to only a limited extent and may partially encapsulate one or more unit cells of first subset 870 during molding. However, the relatively high density of first subset 870 may prevent solid material from flowing beyond first subset 870 deeper into the lattice structure 860, such as into second subset 880. As a result, solid material may not contact or enter second subset 880.

First subset 870 with relatively low unit cell density may serve to facilitate the flow of solid material into first subset 870 during molding. First subset 870 may be configured such that solid material may enter relatively open first subset 870 to fully or partially encapsulate one or more unit cells of first subset 870 during molding. However, the relatively high density of second subset 880 may inhibit or prevent solid material from flowing beyond first subset 870 deeper into the lattice structure 860. As a result, solid material may not fully or partially encapsulate unit cells of the second subset of unit cells 880.

In some embodiments, first subset 870 with a relatively high unit cell density may be arranged at a face of lattice structure 860 configured to interface with solid material at an interface region during molding to limit the extent to which solid material flows into lattice structure 860. In some embodiments, however, a first row of lattice structure 860 at a face of lattice structure 860 may include second subset 880 with a relatively low unit cell density, and first subset 870 with a relatively high unit cell density may be arranged as a second row, or a third row, or beyond, such that solid material may flow into the first row of lattice structure 860 formed by second subset 880, and flow of solid material further into lattice structure 860 is then restricted or limited by first subset 870 arranged at the second row. In such embodiments, first subset 870 may serve as a barrier or screen to slow or stop the flow of solid material into the lattice structure 860.

Further, in some embodiments as shown in FIG. 8A, lattice structure 860 may define one or more channels 890. Channel(s) 890 may be the same as or similar to channel 764 described herein. Channel 890 may have an effective diameter D3 that is greater than an effective diameter D1 of unit cells of first subset 870 or an effective diameter D2 of unit cells of second subset 880 of lattice structure 860. Due to the relatively large effective diameter D3 of channel 890, solid material flows into channel 890 during molding more easily than into the relatively small cell face openings of unit cells of first and second subsets 870, 880. Channel 890 may be completely filled by solid material after molding.

As used herein, an effective diameter of a unit cell is defined as the largest cross-sectional dimension of the volume occupied by a unit cell. For example, for a cubic unit cell, the effective diameter is the diagonal dimension across a square cross section of the cubic unit cell volume.

In some embodiments, all or a portion of a perimeter 891 of channel 890 may be bound by first subset 870, as shown for example in FIG. 8A. As discussed above, first subset 870 may be configured to control or limit the extent to which solid material enters lattice structure 860. Second subset 880 may be connected to first subset 870 around the perimeter 891 of channel 890. For example, first subset 870 may include a first row of lattice structure 860 that bounds channel 890, and second subset 880 may include a second row of lattice structure 860 spaced from channel 980 by first subset 870. However, it is understood that in alternate embodiments, first subset 870 may include multiple consecutive rows, e.g., the first three rows of lattice structure 860, and second subset 880 may include rows of lattice structure 860 beyond the first subset 870, e.g., a fourth row, fifth row, etc. All or a portion of the first subset 870 may be located in an interface region as described herein. In some embodiments, a portion of the second subset 880 may be located in the interface region.

In some embodiments, second subset 880 may form a remainder of lattice structure 860 not formed by first subset 870. In some embodiments, second subset 880 may have lattice parameters selected to provide lattice structure 860 with the desired performance characteristics, whereas first subset 870 may have lattice parameters selected to control or limit flow of solid material into lattice structure 860.

During molding, solid material may flow into and fill channel 890. Solid material may enter first subset 870 and may at least partially encapsulate one or more unit cells of first subset 870. In embodiments where first subset 870 limits the flow of solid material into lattice structure 860, solid material may not flow beyond first subset 870 into a second subset 880, such that solid material does not contact second subset 880.

Figure 8B:
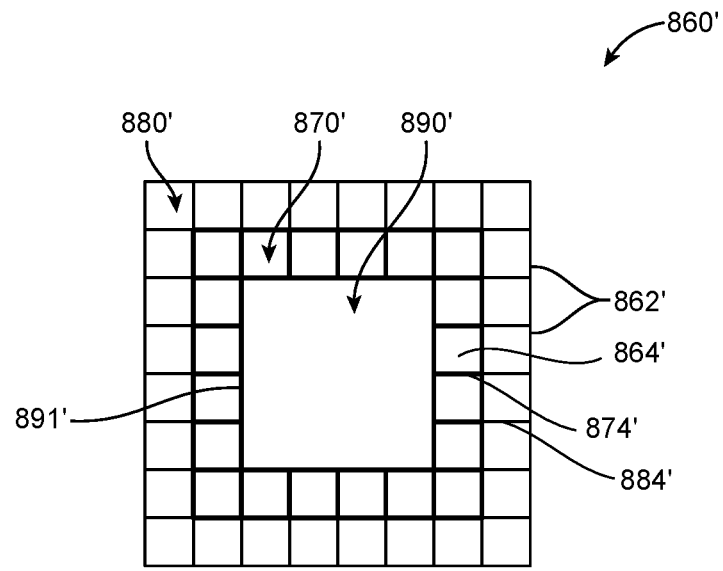

FIG. 8B illustrates an exemplary lattice structure 860' having a plurality of unit cells 862'. Lattice structure 860' includes a first subset of unit cells 870', a second subset of unit cells 880', and a channel 890' with a channel perimeter 891'. Each unit cell of the first subset 870' is formed by a plurality of interconnected struts 874' and each unit cell of the second subset 880' is formed by a plurality of interconnected struts 884'. In contrast to FIG. 8A, first and second subsets 870', 880' may have the same unit cell density. Instead, in FIG. 8B, first subset 870' may have a first strut thickness, and second subset 880' may have a second strut thickness that differs from the first strut thickness.

In some embodiments, the first strut thickness may be greater than the second strut thickness. In some embodiments, the first strut thickness may be at least 10% greater than the second strut thickness. In such embodiments, first subset 870' having higher strut thickness provides relatively small cell face openings 864' through which solid material may flow. Accordingly, first subset 870' may limit the extent to which solid material may flow into lattice structure 860'.

In some embodiments, the first strut thickness may be less than the second strut thickness. In some embodiments, the first strut thickness may be at least 10% less than the second strut thickness. In such embodiments, first subset 870' having smaller strut thickness provides relatively large cell face openings 864' through which solid material may flow. Accordingly, first subset 870' may facilitate the extent to which solid material may flow into lattice structure 870'.

While FIG. 8B illustrates varying strut thickness to vary the cell face openings 864', the size of cell face openings 864' may additionally or alternatively be varied by varying the unit cell density of the first subset of unit cells 870' or the second subset of unit cells 880', or by varying the geometry of the first subset of unit cells 870' or the second subset of unit cells 880'.

The discussion above with respect to FIG. 8A regarding lattice structure 860 and the function and arrangements of first and second subsets 870, 880 applies equally to lattice structure 860' and first and second subsets 870', 880' as the lattice parameters, e.g., unit cell density or strut thickness, may be selected to limit or facilitate the flow of solid material through lattice structure during molding.

It is understood that first and second subsets of a lattice structure may differ in one or more lattice parameters. For example, first subset may differ from second subset in both strut thickness and unit cell density. It is further understood, that lattice structure may have additional subsets of unit cells, such as a third subset of unit cells, fourth subset of unit cells, etc. Such additional subsets may also have differing lattice parameters relative to the first and second subsets.

An exemplary method of forming an article of footwear having a lattice structure and solid region is shown in FIGS. 9A-9D. In step 910, a lattice structure 960 and mold insert 906 are placed in a mold 902 that defines a shape of a sole and an upper of an article of footwear 908. The mold is filled with a solid material as described herein. After molding is complete, mold is opened in step 920, such as by separating an upper mold 903 from lower mold 904. In some embodiments, lower mold 904 may define a portion of a sole of the article of footwear and upper mold 903 may define all of a portion of an upper of the article of footwear. Mold insert 906 may define all or a portion of a foot cavity for receiving a wearer's foot within the article of footwear. In some embodiments, mold insert 906 may be configured to provide a shape of the upper of the footwear in combination with the upper mold 903 and also defines all or a portion of a foot cavity for receiving a wearer's foot within the article of footwear.

In step 930, the mold insert 906 is removed from the mold 902. The co-molded article of footwear 908 is then removed from the mold 902 in step 940.

Footwear 908 includes an upper 901 integrally formed with solid region 907 of sole 905. Upper 901 and solid region 907 of sole 905 are formed of molded solid material. Solid region 907 of sole 905 is mechanically bound to lattice structure 960 at an interface region 970. As shown in FIG. 9D, lattice structure 960 forms a lower portion of sole 905.

While embodiments described herein are directed primarily to articles of footwear, and methods of manufacturing articles of footwear, the disclosure is not limited solely to footwear, and the principles and methods described herein may be applied to manufacture of other co-molded articles having a lattice structure and solid region. Such articles may be useful for example in sporting equipment or apparel, among other applications. For example, co-molded articles described herein may be used in pads for shock absorption and such pads may be integrated into apparel and protective equipment, such as apparel and equipment that may be worn or used by hockey players, football players, baseball catchers, umpires, rollerskaters, skateboarders, skiers, and snowboarders, among others. Exemplary articles of apparel and protective equipment may include helmets, gloves, elbow pads, shin guards, shoulder pads, padded shirts, padded pants or shorts, among other padded garments, It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A sole for an article of footwear, the sole comprising:
   a lattice structure comprising a plurality of unit cells, wherein the plurality of unit cells comprises a first subset of unit cells and a second subset of unit cells that is different than the first subset of unit cells; and
   a solid material, wherein the solid material at least partially encapsulates one or more of the unit cells of the first subset of unit cells;
   wherein the lattice structure and the solid material define a bottom surface of the sole.

2. The sole of claim 1, wherein the lattice structure defines a channel extending at least partially through the lattice structure.

3. The sole of claim 2, wherein the solid material is disposed within the channel defined by the lattice structure.

4. The sole of claim 3, wherein the first subset of unit cells bounds the channel.

5. The sole of claim 1, wherein the lattice structure comprises a toe region of the sole, and the solid material comprises a heel region of the sole.

6. The sole of claim 1, wherein the lattice structure comprises an upper portion of the sole, and the solid material comprises a lower portion of the sole.

7. The sole of claim 1, wherein the solid material comprises an expandable foam material.

8. The sole of claim 1, wherein the solid material does not contact the second subset of unit cells.

9. The sole of claim 1, wherein the first subset of unit cells comprises a lattice parameter that is different than a lattice parameter of the second subset of unit cells.

10. The sole of claim 9, wherein the first subset of unit cells comprises a unit cell density that is greater than a unit cell density of the second subset of unit cells.

11. The sole of claim 9, wherein the first subset of unit cells comprises a cell face opening that is smaller than a cell face opening of the second subset of unit cells.

12. The sole of claim 9, wherein each of the plurality of unit cells comprises a plurality of struts that are interconnected, and wherein the first subset of unit cells comprises a strut thickness that is greater than a strut thickness of the second subset of unit cells.

13. A molded article, comprising:
a lattice structure comprising a plurality of unit cells, wherein the plurality of unit cells comprises a first subset of unit cells and a second subset of unit cells that is different than the first subset of unit cells, wherein the first subset of unit cells comprises a unit cell density that is greater than a unit cell density of the second subset of unit cells; and
a foam material, wherein the foam material at least partially encapsulates one or more of the unit cells of the first subset of unit cells, and wherein the foam material is absent from the second subset of unit cells.

14. The sole of claim 3, comprising reinforcing elements embedded in the solid material disposed within the channel.

15. The sole of claim 1, wherein the solid material forms a layer on top of the lattice structure and extends through the lattice structure to the bottom surface of the sole.

16. The sole of claim 1, wherein the solid material comprises a protrusion that extends beyond the lattice structure and defines a portion of the bottom surface of the sole.

* * * * *